United States Patent
Satou et al.

(10) Patent No.: US 8,796,963 B2
(45) Date of Patent: Aug. 5, 2014

(54) MULTI-PHASE ROTARY MACHINE CONTROL APPARATUS AND ELECTRIC POWER STEERING SYSTEM USING THE SAME

(75) Inventors: Takafumi Satou, Okazaki (JP); Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 13/564,022

(22) Filed: Aug. 1, 2012

(65) Prior Publication Data
US 2013/0033207 A1 Feb. 7, 2013

(30) Foreign Application Priority Data
Aug. 1, 2011 (JP) .................................. 2011-168234

(51) Int. Cl.
*H02P 6/16* (2006.01)
*H02P 21/14* (2006.01)

(52) U.S. Cl.
CPC .................................... *H02P 21/146* (2013.01)
USPC .................. 318/400.04; 318/400.01; 318/700

(58) Field of Classification Search
CPC ............................. H02P 21/146; B62D 5/046
USPC ................................. 318/400.04, 400.01, 700
See application file for complete search history.

(56) References Cited

U.S. PATENT DOCUMENTS 4,814,964 A 3/1989 Schauder et al.
7,138,777 B2 * 11/2006 Won et al. ................ 318/400.02
7,222,008 B2 * 5/2007 Takahashi et al. .............. 701/41
7,694,777 B2 * 4/2010 Yamashita et al. ............ 180/443
2005/0104551 A1 5/2005 Nishimura et al.
2011/0156626 A1 6/2011 Mukai et al.

FOREIGN PATENT DOCUMENTS

| JP | 2001-128484 | 5/2001 |
| JP | 2004-312930 | 11/2004 |
| JP | 2007-143320 | 6/2007 |

OTHER PUBLICATIONS

Office Action (2 pages) dated Jun. 18, 2013, issued in corresponding Japanese Application No. 2011-168234 and English translation (3 pages).

* cited by examiner

*Primary Examiner* — Eduardo Colon-Santana
(74) *Attorney, Agent, or Firm* — Nixon & Vanderhye PC (57) ABSTRACT

A multi-phase rotary machine control apparatus executes calculation processing of an angle error caused by position error in attaching a rotation angle sensor to a motor. The control apparatus sets d-axis and q-axis current command values to zero. A rotary shaft of the rotary machine is rotated externally. The control apparatus detects phase currents caused by a counter-electromotive force, converts phases and outputs voltage command values so that the current detection values become zero. The control apparatus calculates an angle error based on the voltage command values, and stores the angle error as an angle correction value. The control apparatus corrects a detection value of a rotation angle sensor by the stored angle correction value.

14 Claims, 12 Drawing Sheets

MULTI-PHASE ROTARY MACHINE CONTROL APPARATUS AND ELECTRIC POWER STEERING SYSTEM USING THE SAME

CROSS REFERENCE TO RELATED APPLICATION

This application is based on and incorporates herein by reference Japanese patent application No. 2011-168234 filed on Aug. 1, 2011.

FIELD OF TECHNOLOGY

The present disclosure relates to a multi-phase rotary machine control apparatus for controlling a power converter, which supplies drive currents to a set of coils of a multi-phase rotary machine and an electric power steering system using the same.

BACKGROUND TECHNOLOGY

It is conventional to correct a detection error of a rotation angle sensor caused by positioning error in attaching the rotation angle sensor to a multi-phase rotary machine. According to JP 2001-128484A (patent document 1), a positioning error in attaching a resolver to a three-phase motor is detected by comparing an actual motor position detected by the resolver with a theoretical position, at which the motor stops when two phases of three phases of the motor are shorted. A correction value is then calculated based on a comparison result. This correction value is stored in a memory section and used to correct a detected motor position.

According to patent document 1, it is assumed that the correction value need not possibly be changed after the correction value is calculated once at the time of manufacture of a motor, unless the resolver and the motor are detached together from a vehicle after having been mounted once on the vehicle. In case of a motor, which is used in an electric power steering system of a vehicle, for example, a motor body and an electronic control unit (ECU), which controls a motor body in accordance with a motor rotation angle and the like, may be assembled detachably from each other. A rotation angle sensor may be formed, for example, by a combination of a magnet provided at the motor body side and a magnetic detection device provided at the ECU side. According to this sensor configuration, a positioning error will arise between the ECU and the motor when only the ECU is detached and replaced with the motor body being fixedly attached to the vehicle. In this instance, a correction value need be calculated again.

In patent document 1, it is assumed that the shorting of two phases among three phases is performed for each part unit while maintaining the rotary shaft in a free state. As a result, it is not possible under a state that the motor body is mounted on a certain structure with its rotary shaft being coupled to a load. It is therefore required to demount the motor once from the certain structure or replace both the motor and the ECU together for a sole purpose of calculating the correction value. This is not efficient.

SUMMARY

It is therefore an object to provide a multi-phase rotary machine control apparatus, which detects an angle error caused by positioning error of a rotation angle sensor provided to detect a rotation angle of a rotary shaft of the multi-phase rotary machine without demounting the multi-phase rotary machine from a mounting structure.

According to one aspect, a multi-phase rotary machine control apparatus, which supplies drive currents to a set of coils forming a multi-phase rotary machine, comprises a rotation angle sensor, a current detector and a control unit. The rotation angle sensor detects a rotation angle of a rotary shaft of the multi-phase rotary machine. The current detector detects the drive current of each phase. The control unit feeds back each phase current detection values of the current detector and controls voltage command values outputted to the power converter.

The control unit is configured to calculate the voltage command values such that the drive currents become zero when the rotary shaft of the multi-phase rotary machine is rotated externally of the multi-phase rotary machine, to calculate an angle error indicative of a difference between a rotation angle detection value of the rotation angle sensor and an actual rotation angle value of the rotary shaft of the multi-phase rotary machine, and to perform rotation angle correction corresponding to the angle error relative to the rotation angle detection value of the rotation angle sensor.

BRIEF DESCRIPTION OF THE DRAWINGS

The above and other objects, features and advantages will become more apparent from the following description made with reference to the accompanying drawings. In the drawings.

DETAILED DESCRIPTION OF EMBODIMENTS

A multi-phase rotary machine control apparatus will be described with reference to plural embodiments, in which the control apparatus is implemented in an electric power steering system.

(First Embodiment)

A control apparatus for a multi-phase rotary machine, which is referred to as a multi-phase rotary machine control apparatus, according to a first embodiment will be described with reference to FIG. 1 to FIG. 6.

Figure 2:
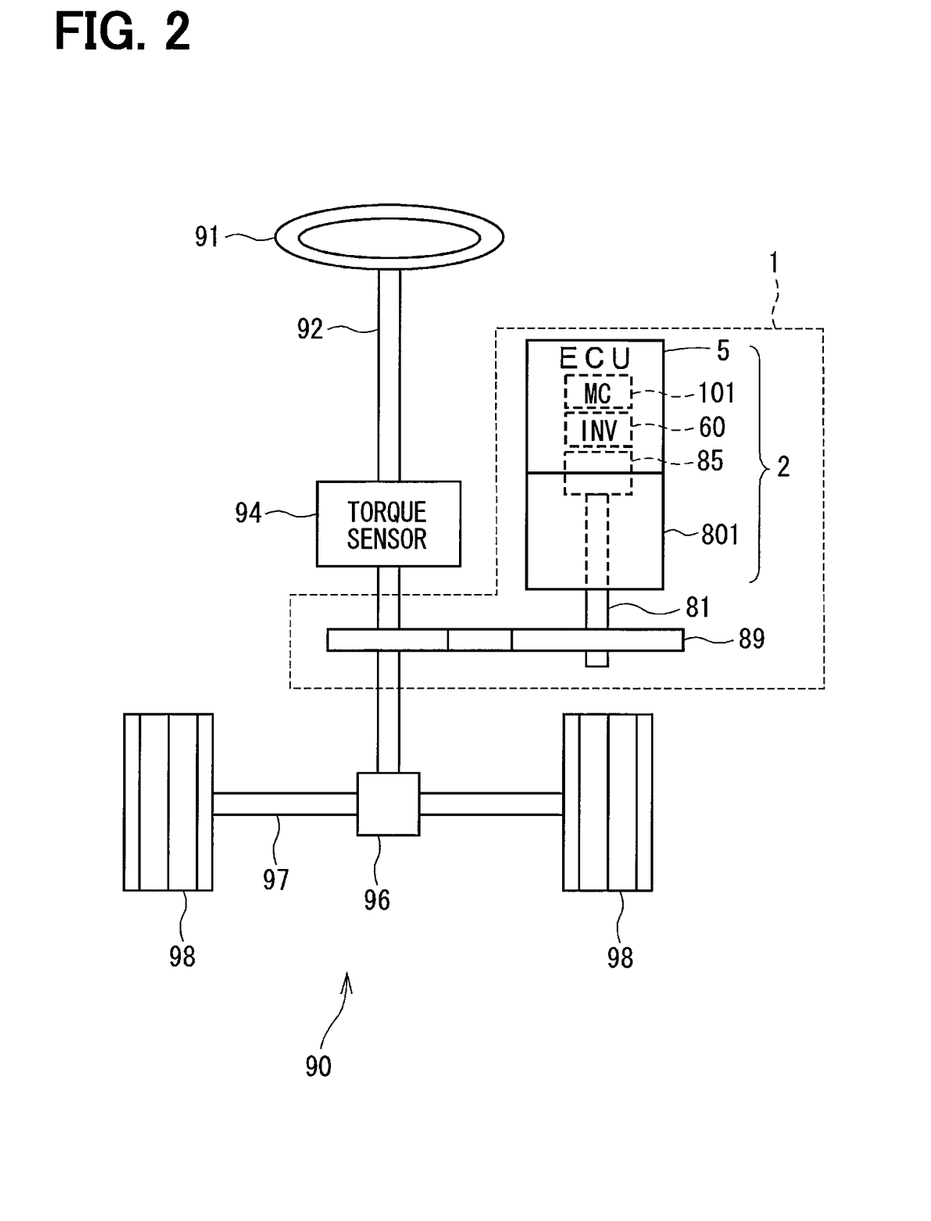
FIG. 2 is a schematic view showing an electric power steering system, which uses the control apparatus for a multi-phase rotary machine according to the first embodiment.

An electric power steering system 1 is provided in a steering system 90 as shown in FIG. 2. In this system 90, a torque sensor 94 is attached to a steering shaft 92 of a steering wheel 91 for detecting a steering torque. A pinion gear 96 is provided at a top end of the steering shaft 92 and engaged with a rack shaft 97. A pair of tire wheels 98 is coupled rotatably to both ends of the rack shaft 97 through tie rods and the like (not shown). The rotary motion of the steering shaft 92 is changed to the linear motion of the rack shaft 97 by the pinion gear 96 so that the pair of tire wheels 98 is steered by an angle corresponding to the linear motion of the rack shaft 97.

The electric power steering system 1 includes an actuator 2 and a reduction gear 89. The actuator 2 rotates a rotary shaft 81. The reduction gear 89 transfers rotation of the rotary shaft 81 to the steering shaft 92 after speed reduction. The actuator 2 is formed of a motor 801 and an ECU (electronic control unit) 5. The motor 801 is a multi-phase rotary machine, which generates steering assist torque. The ECU 5 drives the motor 801. The motor 801 is a three-phase brushless motor, which rotates the reduction gear 89 in both normal and reverse directions. The motor 801 and the ECU 5 are assembled detachably from each other.

The ECU 5 includes therein a microcomputer (MC) 101 and an inverter (INV) 60. The microcomputer 101 is a control unit. The inverter 60 is a power conversion device, which controls power supply to the motor 801 in accordance with commands from the microcomputer 101. A rotation angle sensor 85 is provided on boundaries of the motor 801 and the ECU 5 to detect a rotation angle of the rotary shaft 81 of the motor 801. The rotation angle sensor 85 may be formed of a magnetism detection device such as a magnet as well as a magnetism detection device such as a Hall device or a magneto-resistive device.

In the first embodiment, a magnet is attached to the end of the motor rotary shaft 81 and the magnetism detection device is provided on a substrate of the ECU 5. When the magnet rotates with the rotary shaft 81, the magnetism detection device outputs a voltage signal varying with the rotation angle of the rotary shaft 81. A rotation angle θ is detected based on this output signal. The rotation angle θ indicates an electric angle unless otherwise defined specifically.

A present value of the rotation angle of the rotary shaft 81 is thus fed back to the microcomputer 101. The microcomputer 101 controls outputs to the inverter 60 based on the rotation angle signal, a steering torque signal of the torque sensor 94, a vehicle speed signal of a vehicle speed sensor (not shown) and the like. The actuator 2 of the electric power steering system 1 generates the steering assist torque and transfers it to the steering shaft 92 thereby assisting a steering operation of the steering wheel 91.

Figure 3:
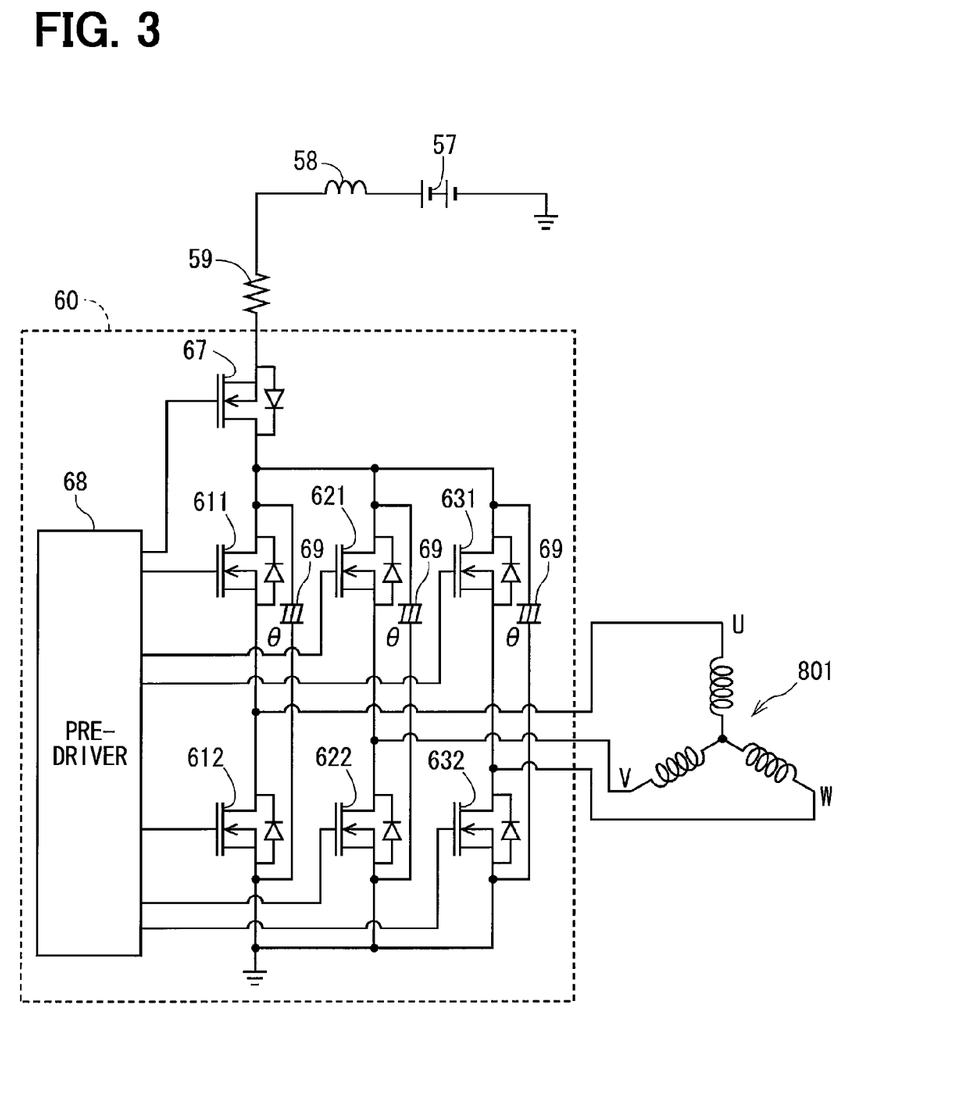
FIG. 3 is a circuit diagram showing an inverter of a first power supply system, which is controlled by the control apparatus for a multi-phase rotary machine according to the first embodiment.

As shown in FIG. 3, the motor 801 includes a set of three phase coils, which are supplied with electric power from the inverter 60. This inverter 60 and the three phase coils corresponding to the inverter 60 jointly form one power supply system to the motor 801. That is, the set of three phase coils of U-phase, V-phase and W-phase of the motor 801 is supplied with power by the inverter 60 of one power supply system.

The inverter 60 converts DC power, which is supplied from a battery 57 through a coil 58 and a resistor 59, to AC power. The inverter 60 is formed of a switching device 67, six switching devices 611, 612, 621, 622, 631 and 632, a pre-driver 68 and capacitors 69. The switching device 67 is provided as a power relay in a three-phase bridge circuit at a battery 57 side. The switching devices 611, 612, 622, 631 and 632 (611 to 632) form an upper arm and a lower arm of the three-phase bridge circuit. The pre-driver 68 outputs gate on-off signals to the switching devices 611-632. The capacitors 69 are connected in parallel to respective arms of the bride circuit to filter out noises.

The switching devices 611 to 632 are, for example, MOS-FETs (metal-oxide-semiconductor field-effect transistors). Junctions between the high potential side switching devices 611, 621 and 631 forming the upper arms and the low potential side switching devices 612, 622 and 632 forming the lower arm are connected to the coils of U-phase, V-phase and W-phase, respectively. Voltages at these junctions are referred to as terminal voltages of the motor 801.

Figure 1:
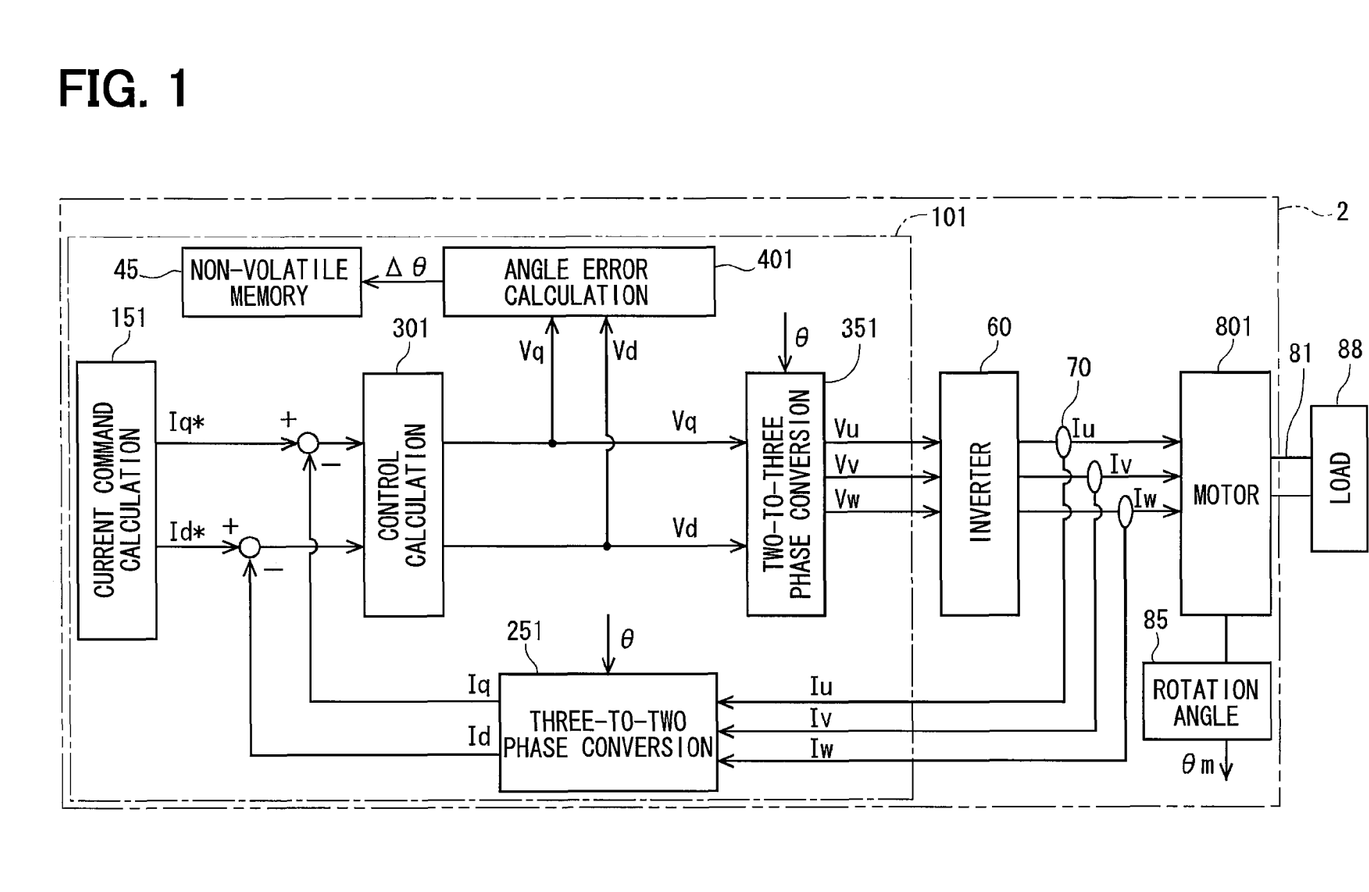
FIG. 1 is a block diagram showing a control apparatus for a multi-phase rotary machine according to a first embodiment.

The actuator 2 including the ECU 5 and the motor 801 is configured as shown in FIG. 1. A load 88, which is driven to rotate by the actuator 2, includes motion loads of the steering shaft 92, which is coupled to the reduction gear 89 and rotated integrally, and of the rack shaft 97, which moves linearly. The load 88 also includes a friction load generated when the tire wheels 98 are steered to change the direction, when the tire wheels 98 are in contact with a road surface.

As shown in FIG. 1, the actuator 2 includes the microcomputer 101, the inverter 60, the motor 801, the rotation angle sensor 85, a current detector 70 and the like. The current detector 70 is provided as a current detection device. The current detector 70 detects phase currents Iu, Iv, Iw, which the inverter 60 supplies to the motor 80, phase by phase. The microcomputer 101 includes a current command value calculation section 151, a three-to-two phase conversion section 251, a control section 301 and a two-to-three phase conversion section 351.

The current command value calculation section 151 outputs current command values Iq* and Id* to a control section 301, which is a control calculation section. In a normal steering assist operation, the torque signal of the torque sensor 94 and the vehicle speed signal of a vehicle speed sensor (not shown) are inputted to the current command value calculation section 151. The current command value calculation section 151 calculates the current command values Iq* and Id* based on these input signals.

Figure 4:
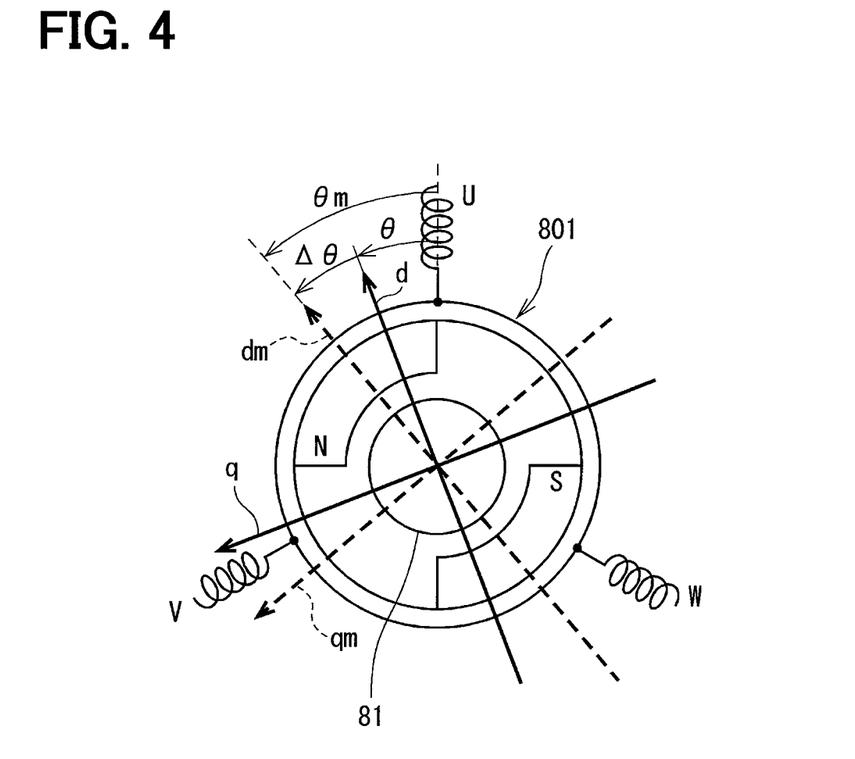
FIG. 4 is an explanatory diagram showing a relation between an actual rotation angle of a motor rotary shaft and a rotation angle detection value of a rotation angle sensor.

The three-to-two phase conversion section 251 converts, based on the rotation angle θ fed back from the rotation angle sensor 85, the three phase current detection values Iu, Iv and Iw of the current detector 70 to a q-axis current detection value Iq and a d-axis current detection value Id. The d-axis current corresponds to an energization current or a field current, which is parallel to the direction of magnetic flux. The q-axis current corresponds to a torque current, which is orthogonal to the direction of magnetic flux. That is, the d-axis current and the q-axis current are orthogonal to each other as shown in FIG. 4. The current axes, by which the phase current is converted, are not limited to the direction of the magnetic flux and the direction orthogonal thereto. The current axes may be vectors, which are orthogonal to each other.

A difference between the command value Iq* and a detection value Iq of the q-axis current as well as a difference between the command value Id* and a detection value Id of the d-axis current are inputted to the control section 301. The control section 301 calculates voltage command values Vq, Vd to converge these differences to zero (0). The control section 301 performs PI (proportional and integral) calculation for example. The two-to-three phase conversion section 351 converts, based on the rotation angle θ fed back from the rotation angle sensor 85, converts the two phase voltage command values Vq and Vd to three phase voltage command values Vu, Vv and Vw of the U-phase, the V-phase and the W-phase.

In a normal steering assist operation, the inverter 60 supplies the motor 80 with the phase currents Iu, Iv and Iw in accordance with the three phase voltage command values Vu, Vv and Vw. The current detection values Iq and Id change following the current command values Iq* and Id*.

When the ECU 5 is assembled to the motor 801 in an initial manufacture time of the actuator 2, the rotation angle sensor 85 may sometimes be attached with some positioning error in the direction of rotation of the shaft 81. When the electric power steering system 1 is repaired, the ECU 5 is assembled to the motor 801 again without replacement in some cases after having been once disassembled from the actuator 2. In other cases, a new ECU 5 is assembled to the motor 801 as a replacement. In those cases, it is likely that the rotation angle sensor 85 is assembled with some positioning error in the direction of rotation.

FIG. 4 shows a relation between the actual rotation angle θ of the motor rotary shaft 81 and the rotation angle detection value θm of the rotation angle sensor 85. The actual rotation angle θ is shown relative to the d-axis and the q-axis indicated by solid lines. The rotation angle detection value θm is shown relative to a dm-axis and a qm-axis indicated by dotted lines as imaginary axes. The difference between the actual rotation angle θ of the rotary shaft 81 and the rotation angle detection value θm is expressed as an angle error Δθ as follows.

$$\Delta\theta = \theta m - \theta \quad (1)$$

The angle error Δθ caused by positioning error or the like will lower control precision of the microcomputer 101.

The microcomputer 101 therefore is provided with an angle error calculation section 401 and a non-volatile memory 45, which is a correction value storage section, in addition to the above-described sections. The angle error calculation section 401 calculates the angle error Δθ based on the voltage command values Vq and Vd outputted from the control section 301 and stores it in the non-volatile memory 45. The actual rotation angle θ is calculated by subtracting the angle correction value Δθ from the rotation angle detection value θm. The microcomputer 101 can thus control the motor by using the corrected rotation angle.

The angle error Δθ is not changed until the ECU 5 is detached from the motor 801 once it has been attached to the motor 801. It is thus only necessary to detect the angle error Δθ only at the time of initial manufacture and at the time of replacement of the ECU 5. This processing is referred to as (rotation angle sensor) angle error calculation processing of the rotation angle sensor 85 and executed partially differently from the normal steering assist operation.

An operation of the angle error calculation processing is described in reference to FIG. 1. As shown in FIG. 1, the motor 801 having the three phase coils is supplied with power from the inverter 60. The current detector 70 detects the three phase currents Iu, Iv and Iw supplied to the coils. These phase current detection values are fed back to the three-to-two phase conversion section 251 together with the rotation angle θ and converted into the q-axis current detection value Iq and the d-axis current detection value Id by the three-to-two phase conversion section 251. The current command value calculation section 151 outputs the current command values Iq* and Id* to attain zero amperes without inputs of the steering torque signal and the vehicle speed signal, which are required in the normal steering assist operation.

When the rotary shaft 81 is driven to rotated an angle θ, the motor 801 generates counter-electromotive forces and currents flow in the three phase coils. Because of the positioning error in attaching the rotation angle sensor 85 to the motor 801, the rotation angle detection value θm of the rotation angle sensor 85 differs from the actual rotation angle θ by an angle Δθ(=θm−θ) as defined by equation (1). If the rotation angle sensor 85 is attached without positioning error and the angle error Δθ is zero, the d-axis current detection value Id is zero. If the rotation angle sensor 85 is attached with some positioning error, the angle error Δθ is not zero and hence the d-axis current detection value is not zero either.

If the d-axis current detection value Id is not zero, the control section 301 calculates the voltage command values Vq and Vd such that the current detection values Iq and Id become zero as commanded by the current command values Iq* and Id*. These voltage command values Vd and Vq are outputted to the two-to-three phase conversion section 351. The two-to-three phase conversion section 351 converts the Vq and Vd to the three phase voltage command values Vu, Vv and Vw and outputs the same to the inverter 60. The three phase voltage command values Vu, Vv and Vw operate to cancel the counter-electromotive forces corresponding to the angle error Δθ.

The angle error calculation section 401 inputs the voltage command values Vq and Vd from the control section 301 and calculates the angle error Δθ as a function of tangent of the voltage command values Vq and Vd, specifically based on the following equation (2) with respect to each system (FIG. 5A to FIG. 5F). In the following equation, A is a constant.

$$\Delta\theta = A \times \tan(Vd/Vq) \quad (2)$$

Figure 5A:
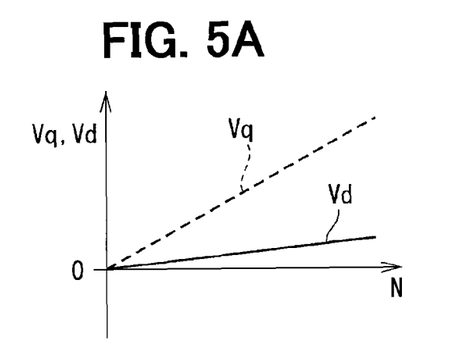
FIGS. 5A, 5B, 5C, 5D, 5E and 5F are explanatory graphs showing relations between a voltage command value and an angle error.
Figure 5B:
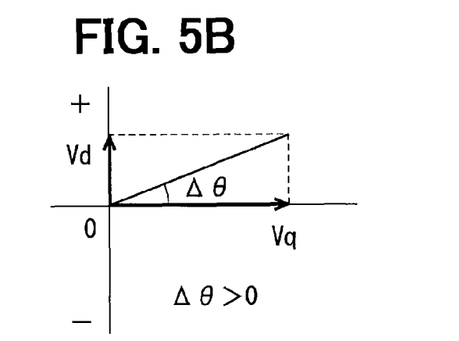
Figure 5C:
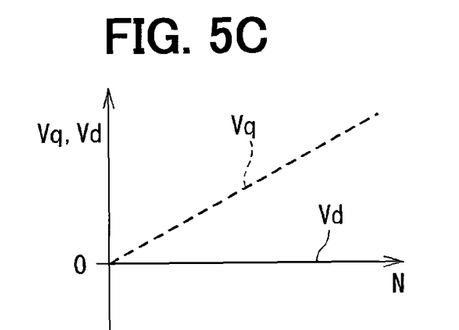
Figure 5D:
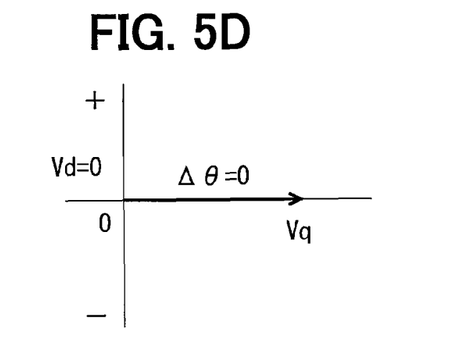
Figure 5E:
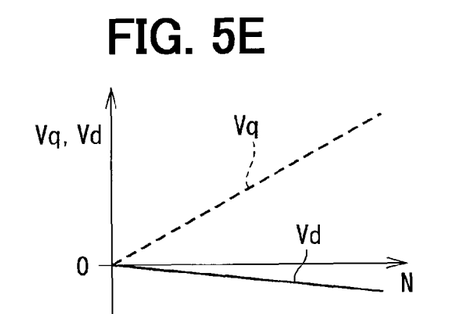
Figure 5F:
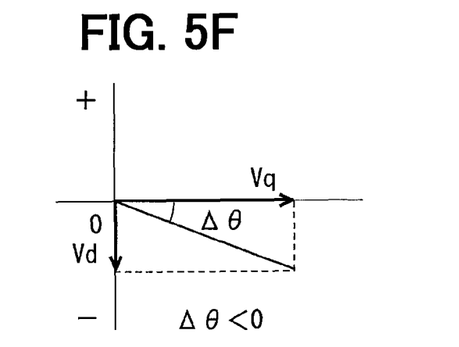

FIG. 5A, FIG. 5C and FIG. 5E show relations between a rotation speed N of the rotary shaft 81 and the voltage command values Vq and Vd. FIG. 5B, FIG. 5D and FIG. 5F show relations between the voltage command values (vectors) Vq, Vd and the angle error Δθ.

FIG. 5C and FIG. 5D show a case, in which the position error is zero (Δθ=0). In this case, the rotation angle detection value θm equals the actual rotation angle θ. FIG. 5A and FIG. 5B show a case, in which the voltage command value Vd and the position error Δθ are larger than zero (Vd>0 and Δθ>0), respectively. FIG. 5E and FIG. 5F show a case, in which the voltage command value Vd and the position error Δθ are smaller than zero (Vd<0 and Δθ<0), respectively. In case that the angle error is present, that is, Δθ≠0, the rotation angle detection value θm need be corrected.

The angle error Δθ is stored in the non-volatile memory 45. The microcomputer 101 uses the position error Δθ as an angle correction value. That is, the corrected rotation angle is calculated by subtracting the angle correction value Δθ from the rotation angle detection value θm of the rotation angle sensor 85. This corrected rotation angle θ is used as the actual rotation angle in controlling the motor 801. Specifically, the corrected rotation angle θ is inputted to the three-to-two phase conversion section 251 and the two-to-three phase conversion section 351 (FIG. 1). The rotation angle error calculation processing executed by the microcomputer 101 will be described next with reference to FIG. 6, in which "S" indicates a step. It is noted that the microcomputer 101 is programmed to execute the following processing steps by software. However, it is assumed here that the microcomputer 101 is configured to execute the following steps by its functional sections 151, 251, 301, 351, 401 and the like, which correspond to hardware circuits.

Figure 6:
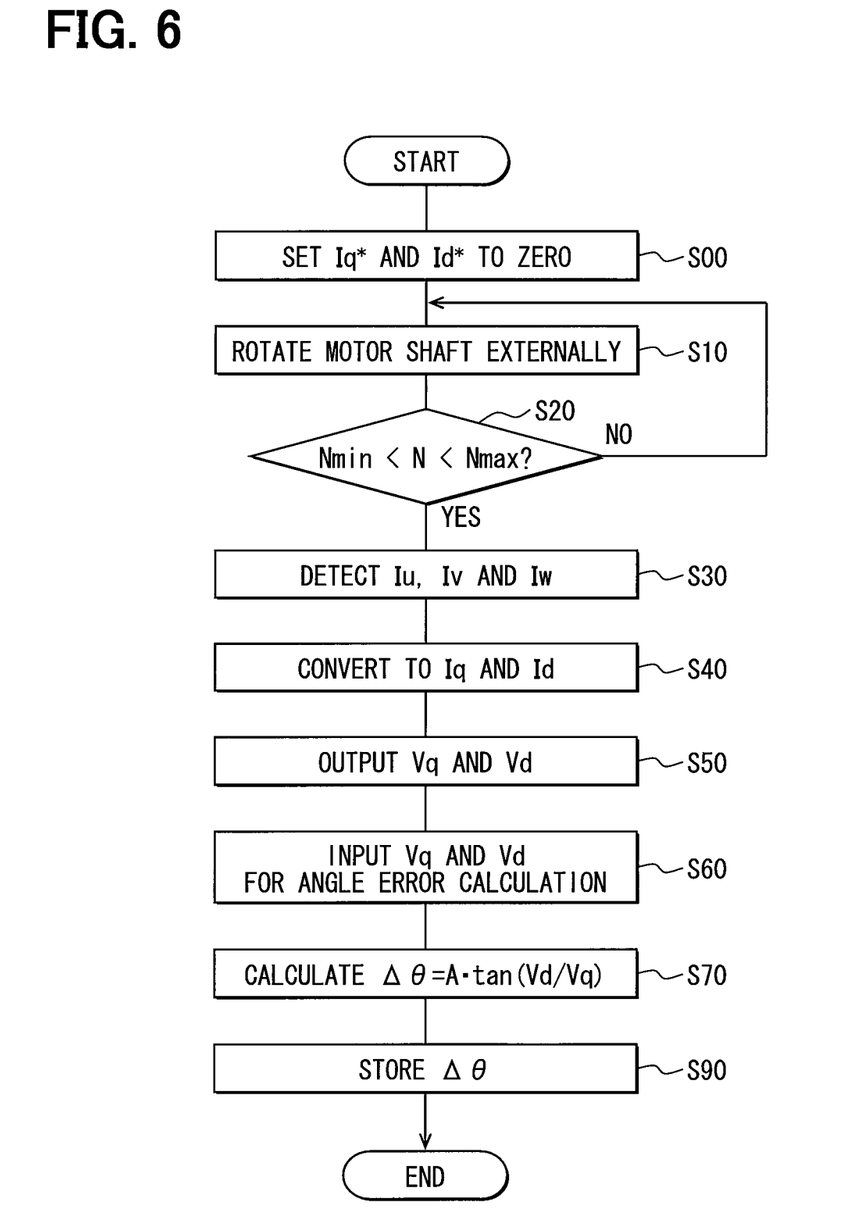
FIG. 6 is a flowchart showing calculation processing of angle error of the rotation angle sensor used in the control apparatus for a multi-phase rotary machine according to the first embodiment.

At S00, the current command values Iq* and Id* are set to zero amperes. At S10, the rotary shaft 81 of the motor 801 is rotated externally, that is, by applying force from an outside. Specifically, the steering shaft 92 is rotated by rotating the steering wheel 91. In this case, the rotary shaft 81 is loaded with a rotary load by friction when the tire wheels 98 are in contact with ground. It is therefore preferred to rotate the steering wheel 91 by elevating a vehicle or on a low friction surface (for example icy ground).

At S20 it is checked whether a rotation speed N (rotation angle per unit time) of the rotary shaft 81 is within a predetermined range defined by a maximum value Nmax and a minimum value Nmin. When the rotation speed is smaller than the minimum value Nmin of the predetermined range, it is understood that the rotary shaft 81 could not be rotated properly due to the rotation load. When the rotation speed is larger than the maximum value Nmax of the predetermined range, it is understood that the rotary shaft 81 was rotated at high speeds which cannot be detected by the rotation angle sensor 85. If the check result at S20 is NO, S10 is repeated by changing the parking condition if necessary. If the check result at S20 is YES, next step S30 is executed.

At S30, the currents Iu, Iv and Iw, which flow in the coils of the motor 801 are detected by the current detector 70. At S40, the detected currents are subjected to three-to-two phase conversion. Here, the currents Iu, Iv and Iw are converted into Iq and Id. At S50, the control section 301 outputs the voltage command values Vq and Vd. At S60, the angle error calculation section 401 inputs the voltage command values Vq and Vd. At S70, the angle error calculation section 401 calculates the angle error $\Delta\theta$. At S90, the angle error $\Delta\theta$ is stored as an angle correction value in the non-volatile memory 45.

According to the first embodiment, the microcomputer 101 calculates the angle error $\Delta\theta$ of the rotation angle sensor 85 with the motor 801 fixed to the vehicle. As a result, when only the ECU 5 is replaced with new one in a case that the ECU 5 including the microcomputer 101 is provided detachably form the motor 801, for example, the angle correction value $\Delta\theta$ is determined to counter the positioning error of the rotation angle sensor 85 without detaching the motor 801 from the vehicle.

Specifically, the rotary shaft 81 of the motor 801 is rotated externally without being affected by the friction between the tire wheels 98 and a road surface so that the counter-electromotive force is generated by each phase coil. The angle error $\Delta\theta$ is calculated only when the rotation speed of the motor 801 is within the predetermined range. That is, when the rotation speed is smaller than the minimum value of the predetermined range, it is determined that the rotary shaft 81 cannot be rotated satisfactorily because of the rotary load. In this case, the angle error is not calculated. When the rotation speed is larger than the maximum value of the predetermined range, it is determined that the rotation angle sensor 85 is incapable of detecting the rotation speed because of its limited detection capability. In this case, the angle error is not calculated either. Thus, erroneous calculation of the angle error $\Delta\theta$ is thus prevented.

(Second Embodiment)

A multi-phase rotary machine control apparatus according to a second embodiment will be described with reference to FIG. 7 and FIG. 8, in which the same or similar parts are designated by the same or similar reference numerals.

Figure 7:
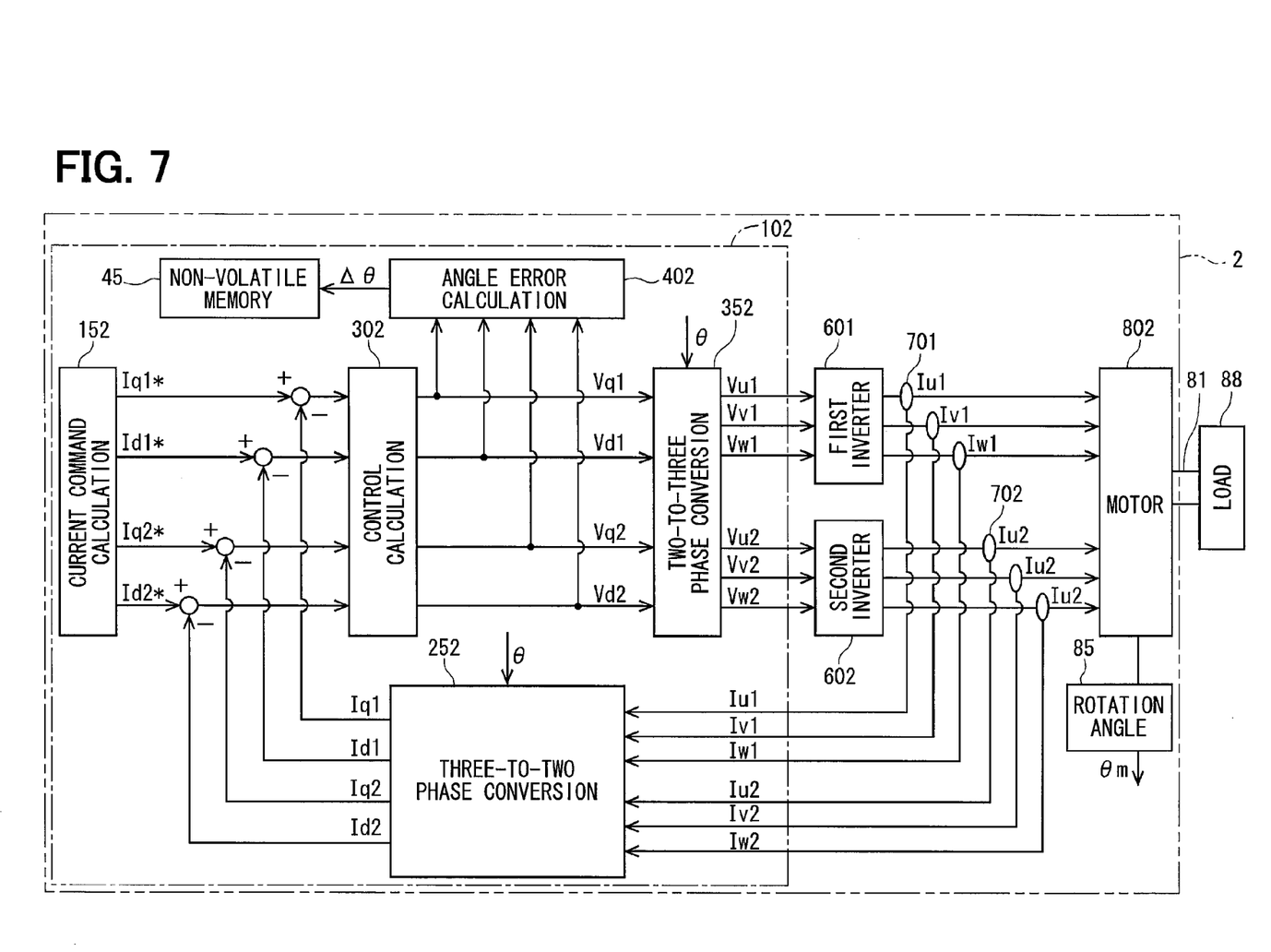
FIG. 7 is a block diagram showing a control apparatus for a multi-phase rotary machine according to a second embodiment.
Figure 8:
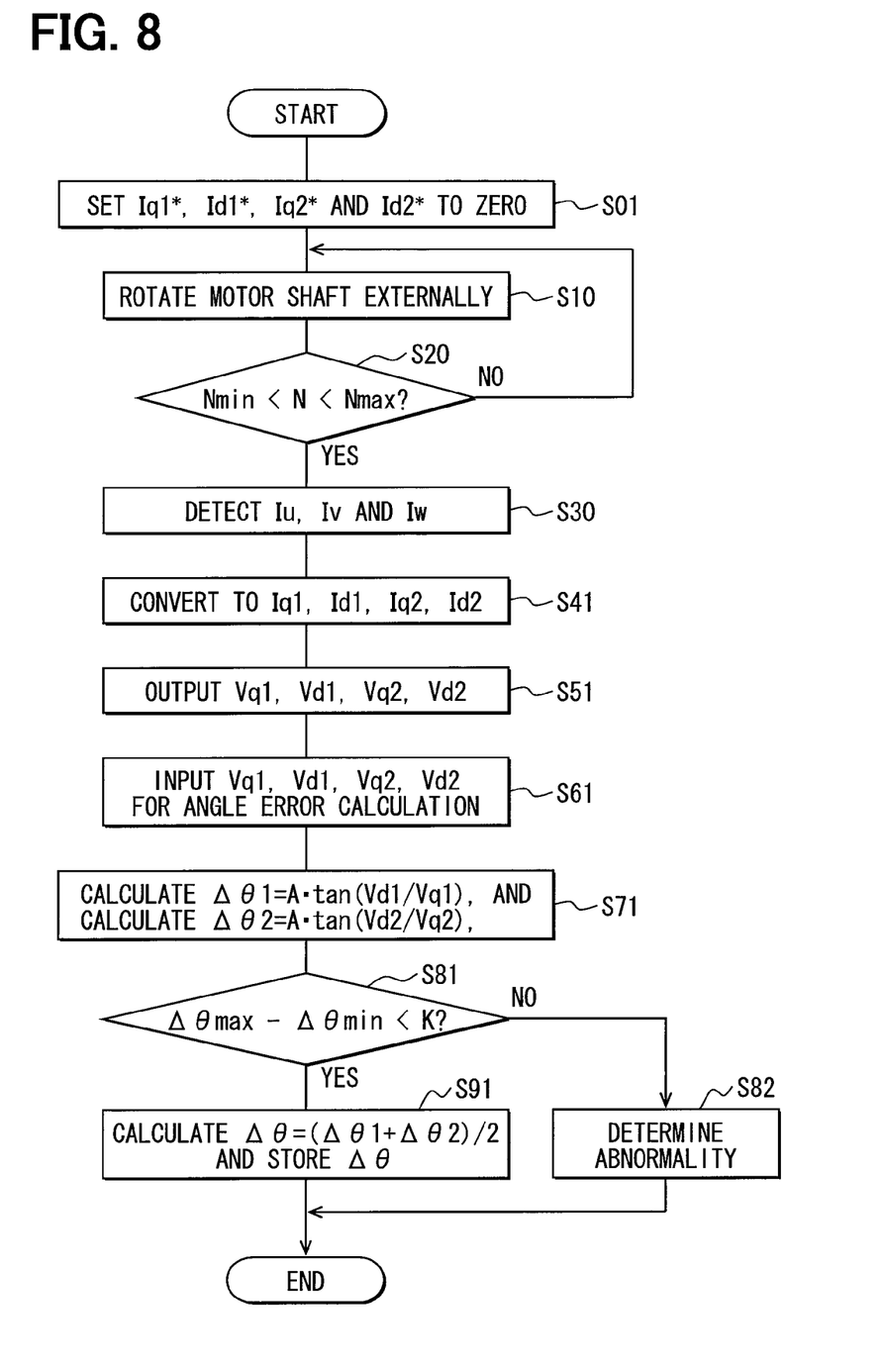
FIG. 8 is a flowchart showing calculation processing of angle error of a rotation angle sensor used in the control apparatus for a multi-phase rotary machine according to the second embodiment.

As shown in FIG. 7, a motor 802 has two sets of three phase coils (first coil set and a second coil set) and supplied with power from two sets inverters (first inverter and second inverter) 601 and 602, respectively. A first current detector 701 detects phase currents Iu1, Iv1, Iw1 supplied to the first coil set of the first power supply system. A second current detector 702 detects second phase currents Iu2, Iv2, Iw2 supplied to the second coil set of the second power supply system. These phase currents are converted by a thee-to-two phase conversion section 252 of a microcomputer 102 into q-axis current detection values Iq1, Iq2 and d-axis current detection values Id1, Id2 with respect to each power supply system. A current command value calculation section 152 outputs current command values Iq1*, Id1*, Iq2* and Id2*, which correspond to zero amperes.

When the rotary shaft 81 is driven to rotate an angle $\theta$, the motor 802 generates counter-electromotive forces and currents flow in the two sets of three phase coils. Because of the positioning error in attaching the rotation angle sensor 85 to the motor 802, the rotation angle detection value $\theta$m of the rotation angle sensor 85 differs from the actual rotation angle $\theta$ by an angle $\Delta\theta(=\theta m-\theta)$ as defined by equation (1). If the rotation angle sensor 85 is attached without positioning error and the angle error $\Delta\theta$ is zero, the d-axis current detection values Id1 and Id2 are zero. If the rotation angle sensor 85 is attached with some positioning error, the angle error $\Delta\theta$ is not zero and hence the d-axis current detection values Id1 and Id2 are not zero either.

If the d-axis current detection values Id1 and Id2 are not zero, a control section 302 calculates the voltage command values Vq1, Vd1, Vq2 and Vd2 such that the current detection values Iq1, Id1, Iq2 and Id2 become zero as commanded by the current command values Iq1*, Id1*, Iq2* and Id2*. These voltage command values Vq1, Vd1, Vq2 and Vd2 are outputted to a two-to-three phase conversion section 352. The two-to-three phase conversion section 352 converts the voltage command values. Vq1, Vd1, Vq2 and Vd2 to the three phase voltage command values Vu1, Vv1, Vw1, Vu2, Vv2 and Vw2 and outputs the same to the inverters 601 and 602. The three phase voltage command values Vu1, Vv1, Vw1, Vu2, Vv2 and Vw2 operate to cancel the counter-electromotive forces corresponding to the angle error $\Delta\theta$.

An angle error calculation section 402 inputs the voltage command values Vq1, Vd1, Vq2 and Vd2 from the control section 302 and calculates the angle errors $\Delta\theta1$ and $\Delta\theta2$ based on the following equations (2a) and (2b) with respect to each power supply system.

$$\Delta\theta1 = A \times \tan(Vd1/Vq1) \qquad (2a)$$

$$\Delta\theta2 = A \times \tan(Vd2/Vq2) \qquad (2b)$$

Then it is checked whether an abnormality is present as described below with reference to a flowchart. If no abnormality is present, an average value of the angle errors $\Delta\theta1$ and $\Delta\theta2$ is calculated based on the following equation (3) and stored in the non-volatile memory 45 as the angle error $\Delta\theta$.

$$\Delta\theta = (\Delta\theta1 + \Delta\theta2)/2 \qquad (3)$$

The microcomputer 102 thereafter uses the angle error $\Delta\theta$ as an angle correction value.

The rotation angle error calculation processing executed by the microcomputer 102 will be described next with reference to FIG. 8. In the flowchart, same step numbers are used to designate the substantially same steps as in the first embodiment. Steps, which are modified in correspondence to a change from one system to two systems, are modified by changing only the last number of step numbers.

At S01, the current command values Iq1*, Id1*, Iq2* and Id2* are all set to zero amperes. S10, S20 and S30 are executed in the same manner as in the first embodiment (FIGS. 6). S41 to S47 are similar to S40 to S70 executed in the first embodiment but the processing in each step is doubled because the number of power supply systems is changed from one system to two systems. At S41, the detected currents are subjected to three-to-two phase conversion with respect to each power supply system. At S51, the control section 302 outputs the voltage command values Vq1, Vd1, Vq2 and Vd2. At S61, the angle error calculation section 402 inputs the voltage command values Vq1, Vd1, Vq2 and Vd2. At S71, the angle error calculation section 402 calculates the angle errors Δθ1 and Δθ2 of the first power supply system and the second power supply system.

S81 and S82 are unique to the second embodiment. At S81, it is checked whether a difference, which is calculated by subtracting a minimum value Δθmin of the angle error Δθ from a maximum value Δθmax of the same is smaller than a predetermined value K.

In case of the two power supply systems, a larger one of the angle errors Δθ1 and Δθ2 corresponds to the maximum value Δθmax and a smaller one of the angle errors Δθ1 and Δθ2 corresponds to the minimum value Δθmin. In case of other embodiments, which include three or more power supply systems, the difference is calculated by determining the maximum value Δθmax and the minimum value Δθmin.

If the check result at S81 is NO, S82 is executed. At S82, it is determined that an abnormality is present and the abnormality is notified to a user by means of a warning light, a buzzer or the like. The check result at S81 becomes NO, when the maximum value Δθmax and the minimum value Δθmin of the position error Δθ, which is calculated with respect to each power supply system, differ more than the predetermined value K. This situation is caused when the inverter 601, 602 or the coil in either one of the plural power supply systems fails or when the rotation angle is not detected precisely because of noise or the like with the inverter and the coil being normal. In case that the rotation position cannot be detected properly because of noise, it will be possible to detect the angle error Δθ precisely when S01 is executed again. In case that the inverter or the coil has a failure, it will be necessary to fix or replace such a failing component.

If the check result at S81 is YES, S91 is executed. At S91, an average of the angle errors Δθ1 and Δθ2 of the two power supply systems is calculated as the angle error Δθ of the whole system and stored in the non-volatile memory 45. In case of other embodiments including three or more systems, an average value of the angle errors of all the power supply systems is calculated as the angle error Δθ.

According to the second embodiment, the non-volatile memory 45 stores as the angle correction value Δθ the average value of the angle errors Δθ1 and Δθ2 calculated by the angle error calculation section 402 with respect to two power supply systems including the inverters 601 and 602. As a result, even if the angle errors differ between the two power supply systems, an optimal angle correction value Δθ is determined.

If the difference between the angle errors Δθ1 and Δθ2 is larger than the predetermined value K, the rotation angle detection value of the rotation angle sensor 85 is determined to be abnormal. When the difference between the angle errors of the respective power supply systems is not in a range, which is normally expected, it is estimated that an abnormality is present. By determining the rotation angle detection value θm as described above, it is prevented that the angle error Δθ is calculated incorrectly and the rotation angle is corrected by the incorrect angle correction value thereafter. Since the abnormality of the rotation angle detection value of the rotation angle sensor 85 is notified to the user, the abnormality can be countered quickly.

(Third Embodiment)

Figure 9:
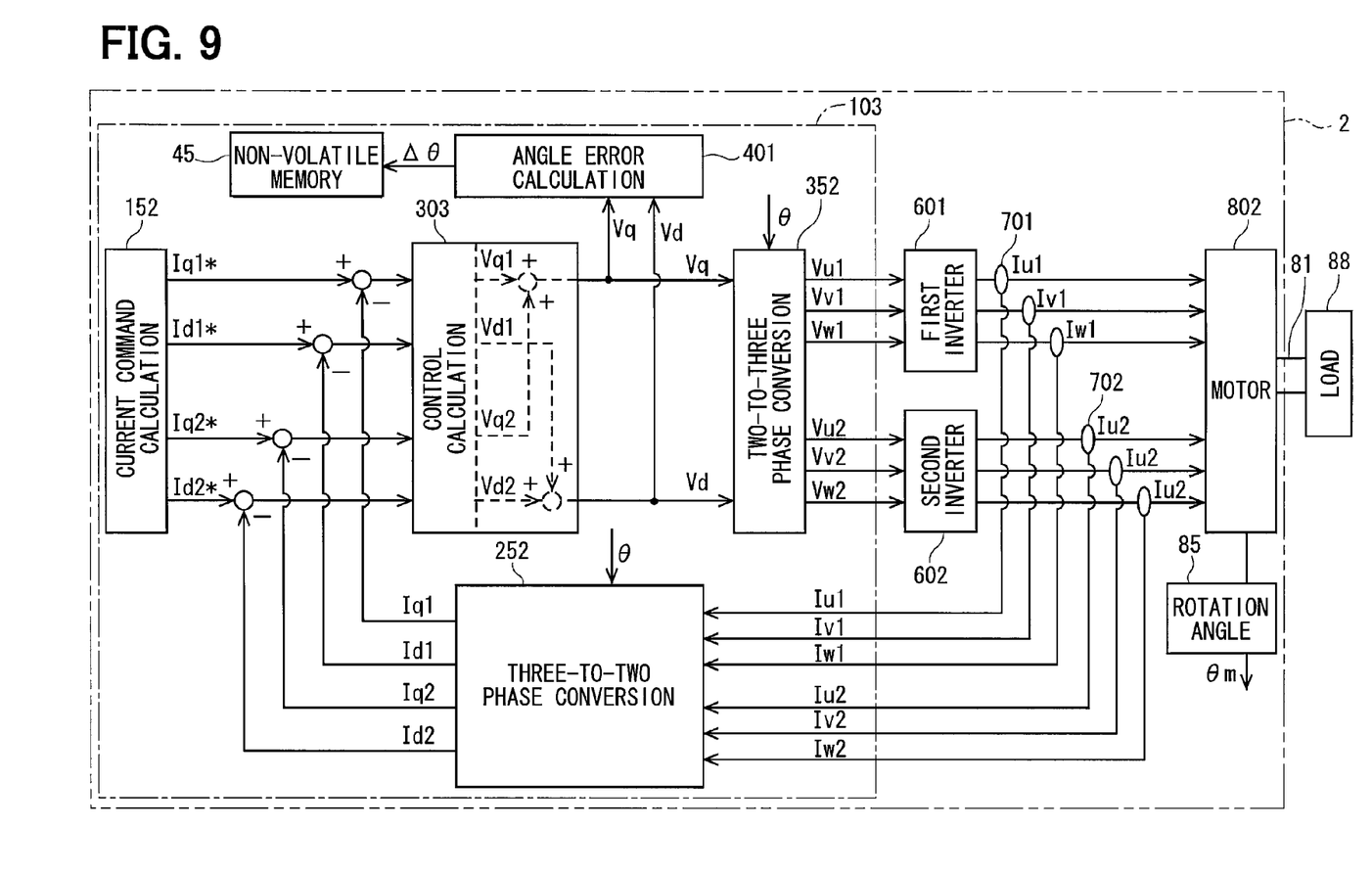
FIG. 9 is a block diagram showing a control apparatus for a multi-phase rotary machine according to a third embodiment.
Figure 10:
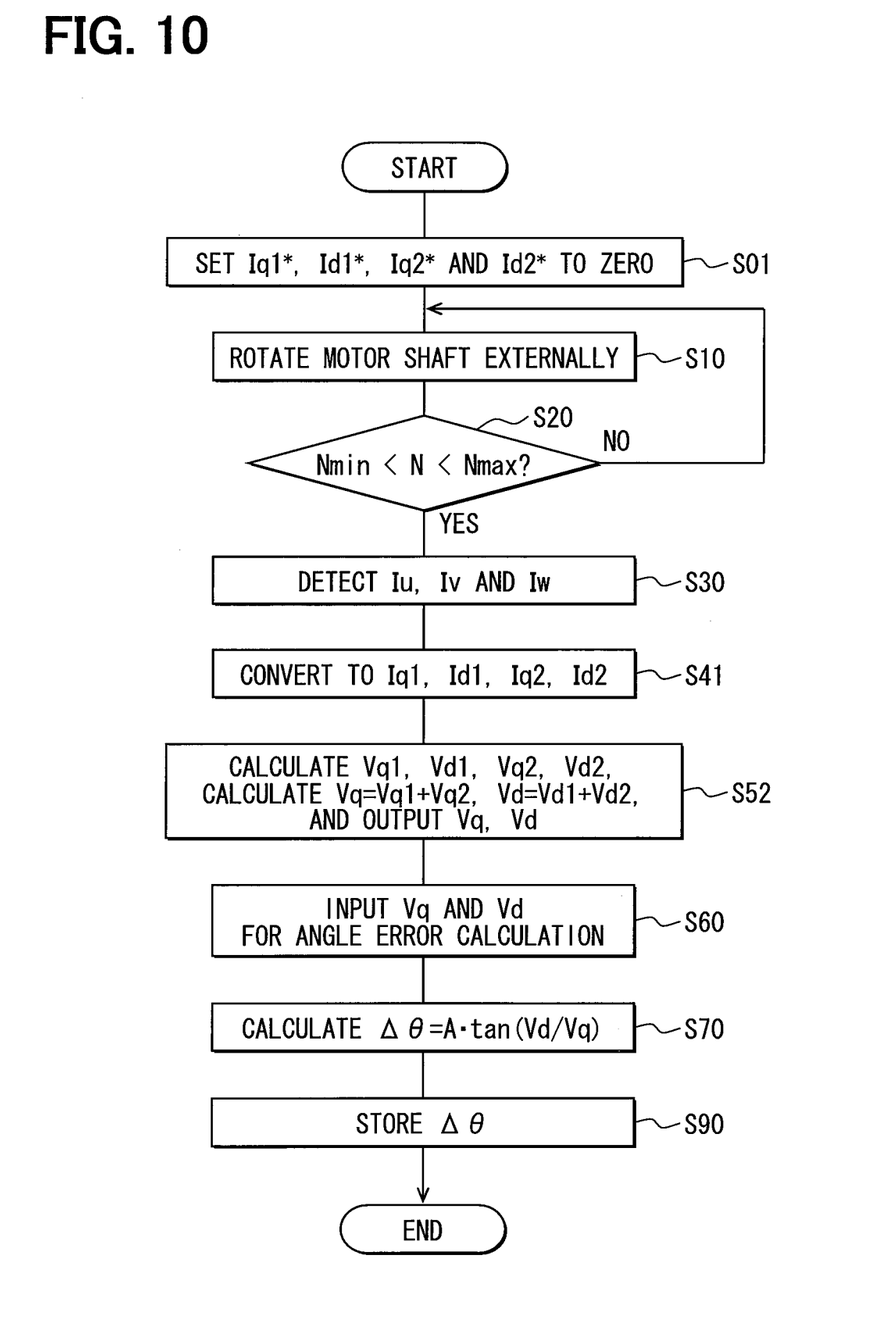
FIG. 10 is a flowchart showing calculation processing of angle error of a rotation angle sensor used in the control apparatus for a multi-phase rotary machine according to the third embodiment.

A multi-phase rotary machine control apparatus according to a third embodiment will be described with reference to FIG. 9 and FIG. 10.

In the third embodiment, the motor 802 has two sets of three phase coils and supplied with power from two sets of inverters 601 and 602, respectively. The current detector 701 detects the phase currents Iu1, Iv1 and Iw1 supplied to the coils of the first power supply system. The current detector 702 detects the phase currents Iu2, Iv2 and Iw2 supplied to the coils of the second power supply system. These phase currents are converted by the thee-to-two phase conversion section 252 of a microcomputer 103 into the q-axis current detection values Iq1, Iq2 and the d-axis current detection values Id1, Id2 with respect to each power supply system. The current command value calculation section 152 outputs the current command values Iq1*, Id1*, Iq2* and Id2*, which correspond to zero ampere.

When the rotary shaft 81 is driven to rotate an angle θ, the motor 802 generates counter-electromotive forces and currents flow in the two sets of three phase coils. Because of the positioning error in attaching the rotation angle sensor 85 to the motor 802, the rotation angle detection value θm of the rotation angle sensor 85 differs from the actual rotation angle θ by an angle Δθ(=θm−θ) as defined by equation (1). If the rotation angle sensor 85 is attached without positioning error and the angle error Δθ is zero, the d-axis current detection values Id1 and Id2 are zero. If the rotation angle sensor 85 is attached with some positioning error, the angle error Δθ is not zero and hence the d-axis current detection values Id1 and Id2 are not zero either.

If the d-axis current detection values Id1 and Id2 are not zero, a control section 303 calculates the voltage command values Vq1, Vd1, Vq2 and Vd2 such that the current detection values Iq1, Id1, Iq2 and Id2 become zero as commanded by the current command values Iq1*, Id1*, Iq2* and Id2*. The voltage command values Vq1 and Vq2 are added, and the voltage command values Vd1 and Vd2 are added. The resulting voltage command values Vq and Vd are outputted to the two-to-three phase conversion section 352. The two-to-three phase conversion section 352 converts the voltage command values Vq and Vd to the three phase voltage command values Vu1, Vv1, Vw1, Vu2, Vv2 and Vw2 and outputs the same to the inverters 601 and 602. The three phase voltage command values Vu1, Vv1, Vw1, Vu2, Vv2 and Vw2 operate to cancel the counter-electromotive forces corresponding to the angle error Δθ.

The angle error calculation section 401 inputs the voltage command values Vq and Vd from the control section 303 and calculates the angle errors Δθ based on the following equation (2) with respect to each power supply system.

$$\Delta\theta = A \times \tan(Vd/Vq) \tag{2}$$

This angle error Δθ is stored in the non-volatile memory 45. The microcomputer 103 thereafter uses the angle error Δθ as the angle correction value.

The rotation angle error calculation processing executed by the microcomputer 103 will be described next with reference to FIG. 10. S01 is executed similarly to the second embodiment (FIGS. 8). S10, S20 and S30 are executed similarly to the first embodiment (FIG. 6). S41 is executed similarly to the second embodiment (FIG. 8), so that the detected currents are subjected to three-to-two phase conversion with respect to each power supply system. At S51, a control section 303 calculates the voltage command values Vq1, Vd1, Vq2 and Vd2. Further, voltage command values Vq and Vd are calculated by adding the voltage command values Vq1 and Vq2, and Vd1 and Vd2. The resulting voltage command values Vq and Vd are outputted. S60, S70 and S90 are executed similarly to the first embodiment (FIG. 6).

According to the third embodiment, the angle error calculation section 401 calculates the voltage command values Vq and Vd of the whole system by calculating sums of the voltage command values of the two power supply systems. As a result, processing load of the angle error calculation section 401 is reduced.

(Fourth Embodiments)

Figure 11:
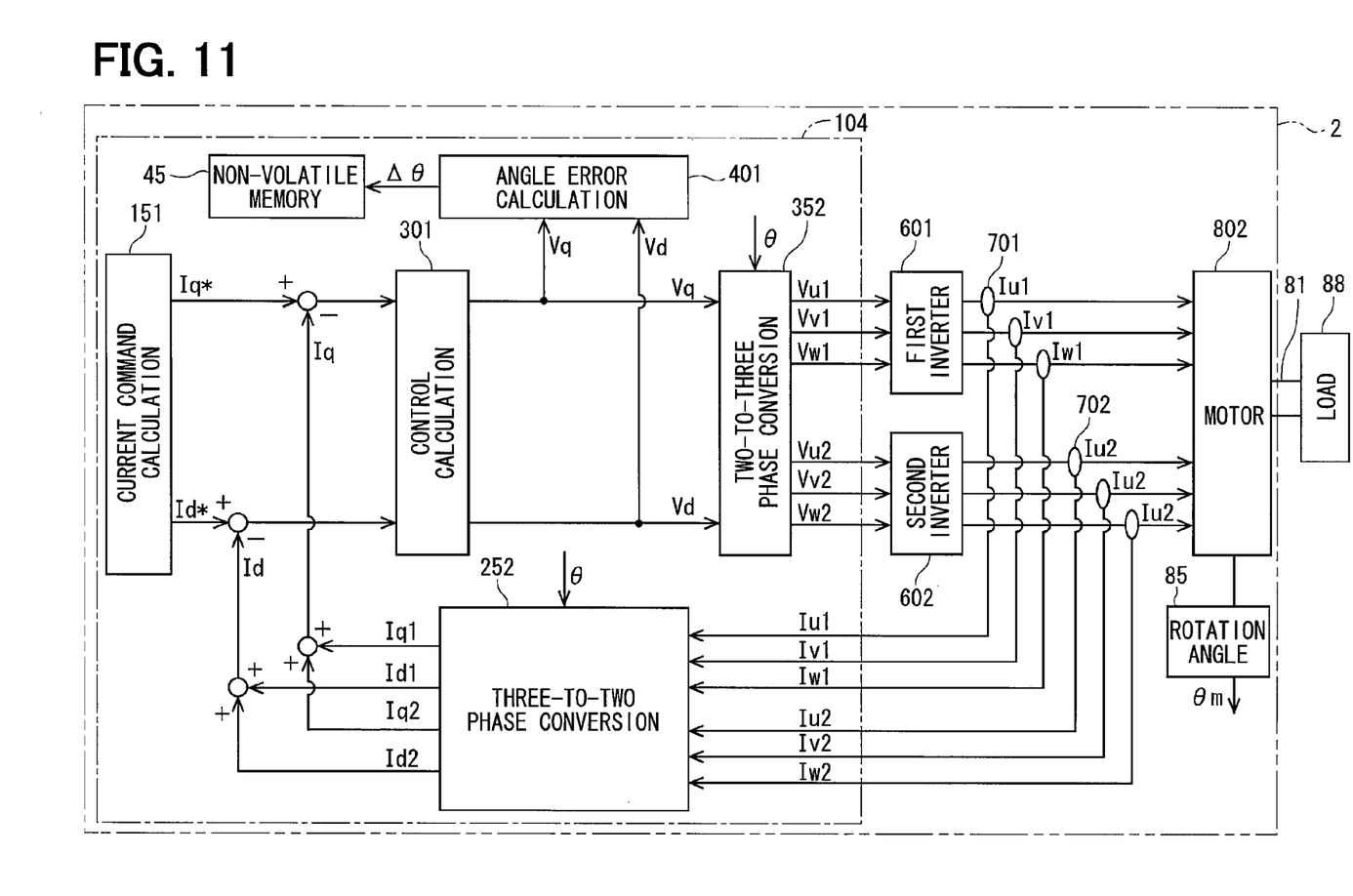
FIG. 11 is a block diagram showing a control apparatus for a multi-phase rotary machine according to a fourth embodiment.
Figure 12:
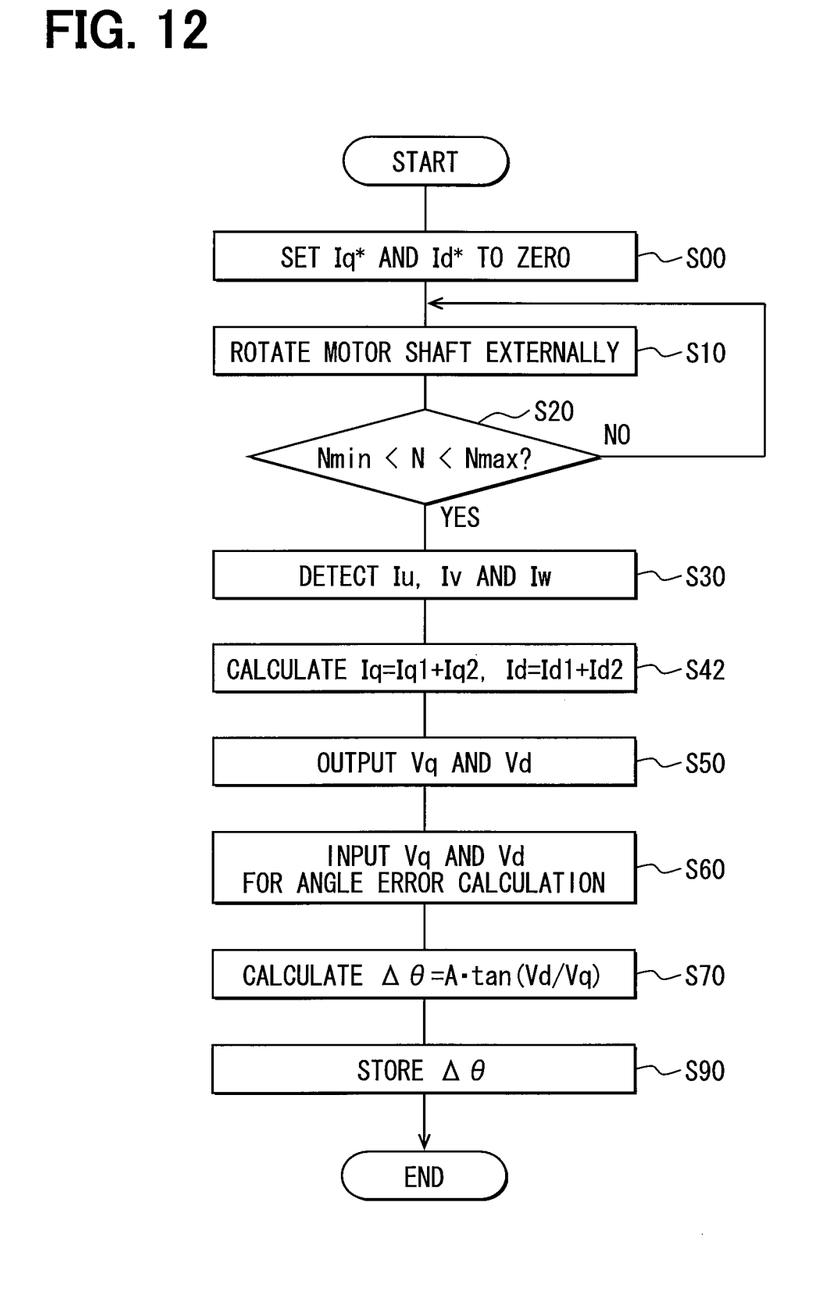
FIG. 12 is a flowchart showing calculation processing of angle error of a rotation angle sensor used in the control apparatus for a multi-phase rotary machine according to the fourth embodiment.

A multi-phase rotary machine control apparatus according to the fourth embodiment will be described with reference to FIG. 11 and FIG. 12.

In the fourth embodiment, the motor 802 has two sets of three phase coils and supplied with power from two sets of inverters 601 and 602, respectively. The current detector 701 detects the phase currents Iu1, Iv1 and Iw1 supplied to the coils of the first power supply system. The current detector 702 detects the phase currents Iu2, Iv2 and Iw2 supplied to the coils of the second power supply system. These phase currents are converted by the thee-to-two phase conversion section 252 of a microcomputer 104 into the q-axis current detection values Iq1, Iq2 and the d-axis current detection values Id1, Id2 with respect to each system. Then a sum of the q-axis current detection values (Iq=Iq1+Iq2) and a sum of the d-axis current detection values (Id=Id1+Id2) are calculated. The current command value calculation section 151 outputs the current command values Iq* and Id*, which correspond to zero ampere.

When the rotary shaft 81 is driven to rotate an angle θ, the motor 802 generates counter-electromotive forces and currents flow in the two sets of three phase coils. Because of the positioning error in attaching the rotation angle sensor 85 to the motor 802, the rotation angle detection value θm of the rotation angle sensor 85 differs from the actual rotation angle θ by an angle $\Delta\theta(=\theta m-\theta)$ as defined by equation (1). If the rotation angle sensor 85 is attached without positioning error and the angle error $\Delta\theta$ is zero, the sum (Id=Id1+Id2) of the d-axis current detection values Id1 and Id2 is zero. If the rotation angle sensor 85 is attached with some positioning error, the angle error $\Delta\theta$ is not zero and hence the sum Id of the d-axis current detection values Id1 and Id2 is not zero either.

If the sum Id of the d-axis current detection values Id1 and Id2 are not zero, the control section 301 calculates the voltage command values Vq and Vd such that the sums Iq and Id of the current detection values become zero as commanded by the current command values Iq* and Id*. The resulting voltage command values Vq and Vd are outputted to the two-to-three phase conversion section 352. The two-to-three phase conversion section 352 converts the voltage command values Vq and Vd to the three phase voltage command values Vu1, Vv1, Vw1, Vu2, Vv2 and Vw2 and outputs the same to the inverters 601 and 602. The three phase voltage command values Vu1, Vv1, Vw1, Vu2, Vv2 and Vw2 operate to cancel the counter-electromotive forces corresponding to the angle error $\Delta\theta$.

The angle error calculation section 401 inputs the voltage command values Vq and Vd from the control section 301 and calculates the angle errors $\Delta\theta$ based on the following equation (2) with respect to each power supply system.

$$\Delta\theta = A \times \tan(Vd/Vq) \quad (2)$$

This angle error $\Delta\theta$ is stored in the non-volatile memory 45. The microcomputer 101 thereafter uses the angle error $\Delta\theta$ as the angle correction value. The rotation angle error calculation processing executed by the microcomputer 104 will be described next with reference to FIGS. 12. S00, S10, S20 and S30 are executed similarly to the first embodiment (FIG. 6). At S42, the three-to-two phase conversion is executed with respect to each power supply system. Further the current command values Iq and Id are calculated by adding Iq1 to Iq2 and adding Id1 to Id2, respectively. S50, S60, S70 and S90 are executed similarly to the first embodiment (FIG. 6).

According to the fourth embodiment, the control section 301 calculates the sums Iq and Id of the current detection values of the two power supply systems become zero ampere as commanded by the current command values Iq* and Id*. As a result, processing load of the control section 301 is reduced.

(Other Embodiments)

The above-described embodiments may be modified further as exemplified below.

(a) The configuration of the inverter 60, 601, 602 provided as the power conversion device, for example, specifications of the switching devices 611 to 632, the power relay 67, the capacitors 69 are not limited to those exemplified in FIG. 3.

(b) The power substrate, which mounts thereon the power inverter 60, 601, 602 and the like, may be formed integrally with or separately from the control substrate, which mounts thereon the microcomputer 101 to 104 and the like. That is, the power substrate including the inverter 60 and the like may be on the microcomputer 101 side or the motor 801 side, when the microcomputer 101 and the like provided as the control device is detached from the motor 801 and the like.

(c) In the second embodiment, in which the average value of the angle errors $\Delta\theta 1$ and $\Delta\theta 2$ of the two power supply systems is calculated, it may be calculated by weighting.

(d) The second to the fourth embodiments described with reference to two power supply systems, they may be modified to three or more systems.

What is claimed is:

1. A multi-phase rotary machine control apparatus for controlling a power converter, which supplies drive currents to a set of coils forming a multi-phase rotary machine, the control apparatus comprising:
a rotation angle sensor for detecting a rotation angle of a rotary shaft of the multi-phase rotary machine;
a current detector for detecting the drive of each phase; and
a control unit for feeding back each phase current detection values of the current detector and controlling voltage command values outputted to the power convertor; wherein
the control unit is configured to calculate the voltage command values such that the drive currents become zero when the rotary shaft of the multi-phase rotary machine is rotated externally of the multi-phase machine, to calculate an angle error indicative of a difference between a rotation angle detection value of the rotation angle sensor and an actual rotation angle value of the rotary shaft of the multi-phase rotary machine, and to perform rotation angle correction corresponding to the angle error relative to the rotation angle detection value of the rotation angle sensor; and the control unit includes:
- a current conversion section for converting the each phase current detection value of the current detector into current detection values of a d-axis and a q-axis, which are orthogonal to each other;
- a current command value calculation section for commanding zero amperes as the current command values of the d-axis and the q-axis;
- a control calculation section for calculating the voltage command values of the d-axis and the q-axis so that the current detection values become zero ampere;
- an angle error calculation section for calculating the angle error based on the voltage command values of the d-axis and the q-axis calculated by the control calculation section; and
- an angle correction value memory section for storing the angle error calculated by the angle error calculation section as an angle correction value, and
- wherein the angle error calculation section is configured to calculate the angle error as $\Delta\theta = A \times \tan(Vd/Vq)$ assuming that $\Delta\theta$ is the angle error, and Vd and Vq are the voltage command values of the d-axis and the q-axis calculated by the control calculation section when the rotary shaft of the multi-phase rotary machine is rotated externally.

2. The multi-phase rotary machine control apparatus according to claim 1, wherein:
the control calculation section is configured to calculate the angle error only when a rotation speed of the multi-phase rotary machine is within a predetermined range when the rotary shaft of the multi-phase rotary machine is rotated externally.

3. The multi-phase rotary machine control apparatus according to claim 2, wherein:
the angle error calculation section is configured to calculate the angle error with respect to each of a plurality of power converters corresponding to a plurality of sets of coils provided in the multi-phase rotary machine; and
the angle correction value memory section is configured to store an average value of a plurality of angle errors calculated in correspondence to the plurality of power converters.

4. The multi-phase rotary machine control apparatus according to claim 3, wherein:
the control unit is configured to determine an abnormality of the rotation angle detection value of the rotation angle sensor, when a difference between a maximum value and a minimum value of the plurality of angle errors of the plurality of power converters is larger than a predetermined value.

5. The multi-phase rotary machine control apparatus according to claim 4, wherein:
the control unit is configured to notify a user of the abnormality of the rotation angle sensor.

6. The multi-phase rotary machine control apparatus according to claim 2, wherein:
the angle error calculation section is configured to calculate the angle error based on a sum of the voltage command values calculated by the control calculation section with respect to each of a plurality of power converters corresponding to a plurality of sets of coils provided in the multi-phase rotary machine.

7. The multi-phase rotary machine control apparatus according to claim 2, wherein:
the control calculation section is configured to calculate a sum of the current command values, which are converted by the current conversion section with respect to each of a plurality of power converters corresponding to a plurality of sets of coils provided in the multi-phase rotary machine, so that the sum of the current command values becomes zero.

8. The multi-phase rotary machine control apparatus according to claim 1, wherein:
the angle error calculation section is configured to calculate the angle error with respect to each of a plurality of power converters corresponding to a plurality of sets of coils provided in the multi-phase rotary machine; and
the angle correction value memory section is configured to store an average value of a plurality of angle errors calculated in correspondence to the plurality of power converters.

9. The multi-phase rotary machine control apparatus according to claim 8, wherein:
the control unit is configured to determine an abnormality of the rotation angle detection value of the rotation angle sensor, when a difference between a maximum value and a minimum value of the plurality of angle errors of the plurality of power converters is larger than a predetermined value.

10. The multi-phase rotary machine control apparatus according to claim 9, wherein:
the control unit is configured to notify a user of the abnormality of the rotation angle sensor.

11. The multi-phase rotary machine control apparatus according to claim 1, wherein:
the angle error calculation section is configured to calculate the angle error based on a sum of the voltage command values calculated by the control calculation section with respect to each of a plurality of power converters corresponding to a plurality of sets of coils provided in the multi-phase rotary machine.

12. The multi-phase rotary machine control apparatus according to claim 1, wherein:
the control calculation section is configured to calculate a sum of the current command values, which are converted by the current conversion section with respect to each of a plurality of power converters corresponding to a plurality of sets of coils provided in the multi-phase rotary machine, so that the sum of the current command values becomes zero.

13. An electric power steering system comprising:
the multi-phase rotary machine control apparatus according to claim 1, and
a drive power transfer device for transferring rotation of the multi-phase rotary machine to a steering shaft thereby to assist a steering operation of a vehicle.

14. The multi-phase rotary machine control apparatus according to claim 1, wherein:
the control calculation section is configured to calculate the angle error only when a rotation speed of the multi-phase rotary machine is within a predetermined range when the rotary shaft of the multi-phase rotary machine is rotated externally.

* * * * *